(12) United States Patent
Jin

(10) Patent No.: US 8,056,986 B2
(45) Date of Patent: Nov. 15, 2011

(54) WHEEL FOR VEHICLE

(75) Inventor: Jaegul Jin, Ulsan (KR)

(73) Assignee: Hyundai Mobis Co., Ltd., Seoul (KR)

( * ) Notice: Subject to any disclaimer, the term of this patent is extended or adjusted under 35 U.S.C. 154(b) by 127 days.

(21) Appl. No.: 12/544,155

(22) Filed: Aug. 19, 2009

(65) Prior Publication Data
US 2010/0066156 A1    Mar. 18, 2010

(30) Foreign Application Priority Data

Sep. 18, 2008    (KR) .................. 10-2008-0091547

(51) Int. Cl.
*B60B 3/10* (2006.01)
(52) U.S. Cl. .......... 301/64.101; 301/63.101; 29/894.322
(58) Field of Classification Search .................. 301/6.3, 301/63.101, 63.103, 63.104, 64.101; 29/894.322, 29/894.323, 894.325
See application file for complete search history.

(56) References Cited

U.S. PATENT DOCUMENTS

| | | | | |
|---|---|---|---|---|
| 1,750,483 | A * | 3/1930 | Michelin | 301/35.59 |
| 2,053,367 | A * | 9/1936 | Hamill | 301/6.3 |
| 2,143,457 | A * | 1/1939 | Sinclair | 301/35.625 |
| 5,788,334 | A * | 8/1998 | Renard | 301/5.24 |
| 6,332,653 | B1 * | 12/2001 | Shimizu et al. | 301/63.101 |
| 7,018,000 | B2 * | 3/2006 | Alff et al. | 301/63.107 |
| 7,059,685 | B2 * | 6/2006 | Kermelk et al. | 301/64.101 |
| 7,785,452 | B2 * | 8/2010 | Wei | 204/280 |

FOREIGN PATENT DOCUMENTS

| | | | | |
|---|---|---|---|---|
| JP | 2004026017 | A | * | 1/2004 |
| JP | 2007137209 | A | * | 6/2007 |
| KR | 2002051588 | A | * | 6/2002 |

* cited by examiner

*Primary Examiner* — Joe Morano, IV
*Assistant Examiner* — Kip T Kotter
(74) *Attorney, Agent, or Firm* — Knobbe Martens Olson & Bear LLP

(57) ABSTRACT

The present disclosure relates to a wheel for a vehicle, in which burrs that are created in forming vent holes do not contact with the inner circumference of rim when disc is combined with rim, such that it is possible to prevent damage to the inside of rim due to burrs. Further, a hub cap is formed for covering a hub hole and separably combined with a cylindrical protrusion of disc, such that it is possible to reduce the manufacturing cost and the weight, and improve the fuel efficiency. Furthermore, a plurality of water discharge holes is formed along the joint of rim and disc, such that the water discharge holes make it possible to prevent water from collecting again at the joint of rim and disc after a process of removing water.

6 Claims, 4 Drawing Sheets

WHEEL FOR VEHICLE

CROSS-REFERENCE TO RELATED APPLICATIONS

The present application claims priority to Korean Application Serial Number 10-2008-0091547, filed on Sep. 18, 2008, the disclosure of which is hereby incorporated by reference herein in its entirety.

FIELD

The present disclosure relates to a wheel for a vehicle.

BACKGROUND

In general, a wheel for a vehicle, as shown in FIGS. 1 and 2, includes a rim 10 supporting a tire and a disc 20 that is integrally fitted to the rim 10 and is to be connected to an axle shaft.

In a type of wheel illustrated in FIG. 2, the disc 20 is press-fitted inside the rim 10 in the direction of an arrow shown in FIG. 2. The disc 20 is then integrated to the rim 10 by welding, in which the inner circumference of rim 10 is fixed to the outer circumference of disc 20.

The disc 20 includes a hub hole 21 at the center portion, in which the hub hole 21 is defined by a cylindrical flange 22 protruding to one side of the disc 20. A hub cap (not shown in FIG. 1 or 2) is to cover the hole 21 and a portion of the disc 20.

The disc 20 includes a plurality of vent holes 23 that are circumferentially arranged at radially predetermined positions from the center of hub hole 21. The vent holes 23 are to let heat from braking discharge to outside.

In typical production of the disc 20, burrs 24 are formed on the edges of vent holes 23. Also, in typical production of the wheel, the disc 20 is forcibly press-fitted into the rim 10, without removing the burrs 24.

Therefore, the inside of rim 10 can be damaged by burrs 24, when disc 20 with burrs 24 is forcibly press-fitted into the rim 10 in the direction of the arrow shown in FIG. 2.

Although it is possible to remove the burrs 24 by a post-machining, a large amount of time and cost would be required for the post-machining.

Further, once the rim 10 and disc 20 have been assembled together, the assembly is typically washed with water, and then water is removed and the assembly is coated after the washing. However, during the washing, some water may be kept between the inner circumference of the rim 10 and the outer circumference of the disc 20, and the water may not be completely removed, even if the water is removed by injecting high-pressure air (Reference character M1 in FIG. 1 indicates the portion where water collects again after the process of removing water). Thus, when coating is performed without completely removing water, spots may be created in the resulting coating.

The foregoing discussion is solely to provide background information, and does not and should not constitute admission of prior art.

SUMMARY

Embodiments provide a wheel for a vehicle that prevents damage to the inside of a rim by burrs created in forming vent holes through a disc when the disc is combined with the rim, reduces the manufacturing cost and the weight and improve the fuel efficiency by forming a combination structure with a hub cap to a cylindrical protrusion of the disc for forming a hub hole to form the hub cap in the minimum size for covering only the hub hole, and prevents water from collecting again to the joint of the rim and the disc after a washing process by forming water discharge holes at the joint of the rim and the disc.

A wheel for a vehicle according to an embodiment includes a rim supporting a tire and a disc integrally combined with the rim and fitted on an axle shaft, in which a cap fitting groove for fitting a hub cap is formed on a cylindrical protrusion that protrude to one side from the center portion of the disc, wherein the radius from the center of the disc to the end of a burr formed on the edge of a vent hole is smaller than the radius from the center of the disc to the outer circumference of the disc, and wherein a plurality of water discharge holes are circumferentially formed along the joint of the rim and disc.

According to one embodiment, burrs that are created in forming vent holes do not contact with the inner circumference of the rim when the disc is combined with the rim, such that it is possible to prevent damage to the inside of the rim due to the burrs. Further, the hub cap is formed in the minimum size for covering only the hub hole and separably combined with the cylindrical protrusion of the disc, such that it is possible to reduce the manufacturing cost and the weight, and improve the fuel efficiency. Furthermore, a plurality of water discharge holes is formed along the joint of the rim and the disc, such that the water discharge holes make it possible to prevent water from collecting again at the joint of the rim and the disc after a process of removing water.

BRIEF DESCRIPTION OF THE DRAWINGS

For better understanding of the present disclosure, reference should be made to the following detailed description with the accompanying drawings, in which.

DETAILED DESCRIPTION OF EMBODIMENTS

Some embodiments are described hereafter in detail with reference to the accompanying drawings.

Figure 1:
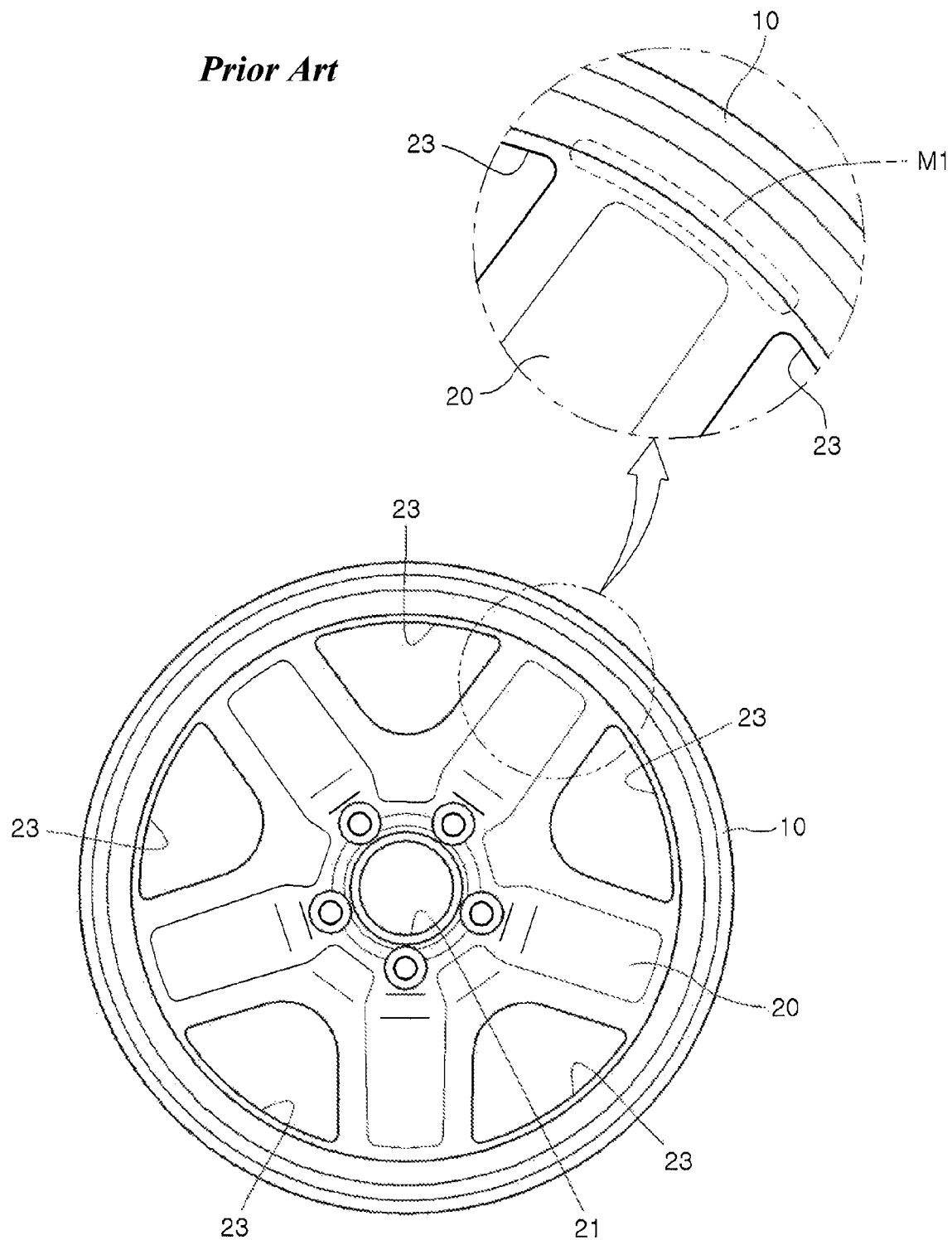
FIGS. 1 and 2 are a front view and cross-sectional view illustrating a wheel for a vehicle in the related art, respectively.
Figure 2:
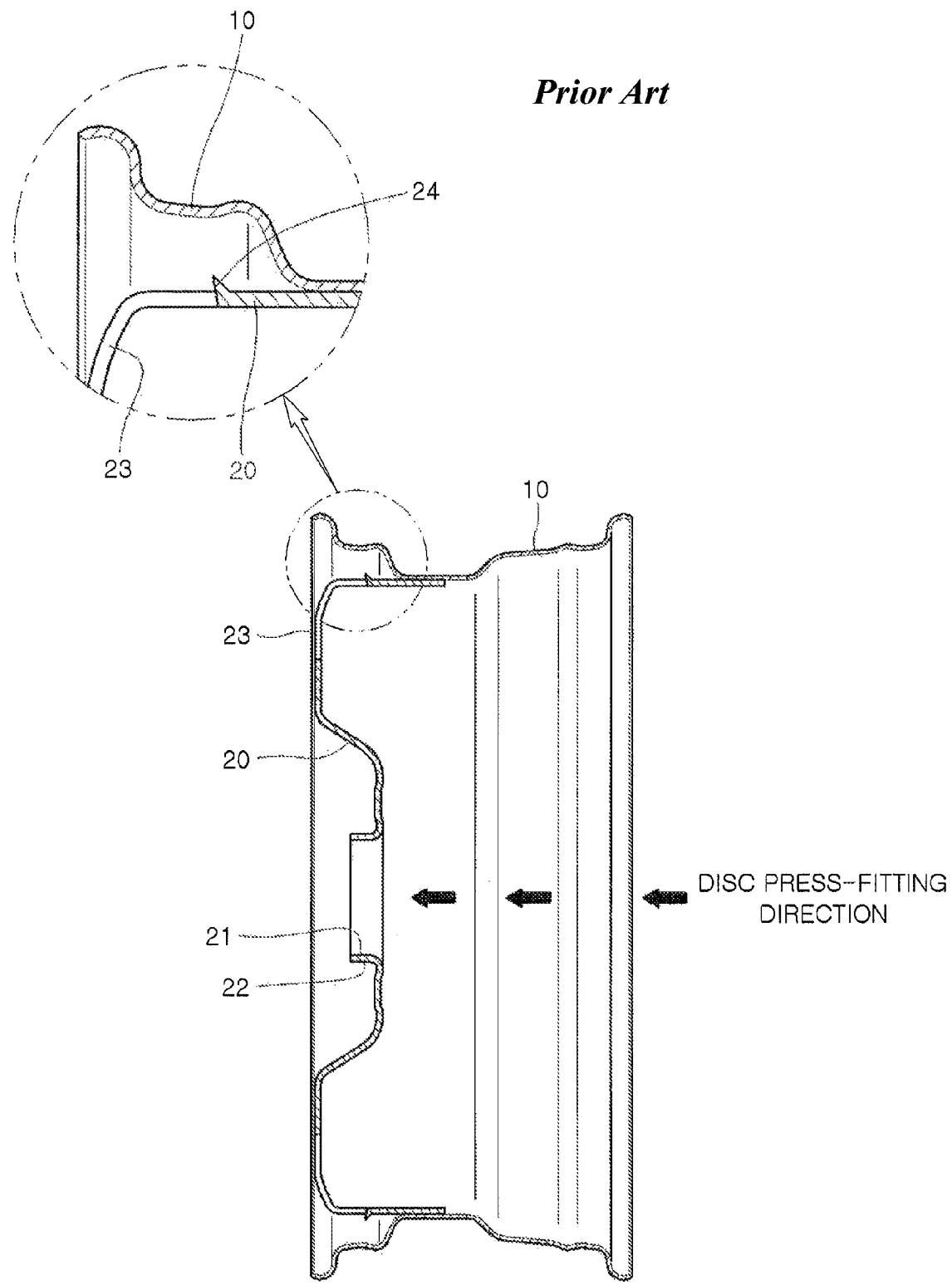
Figure 3:
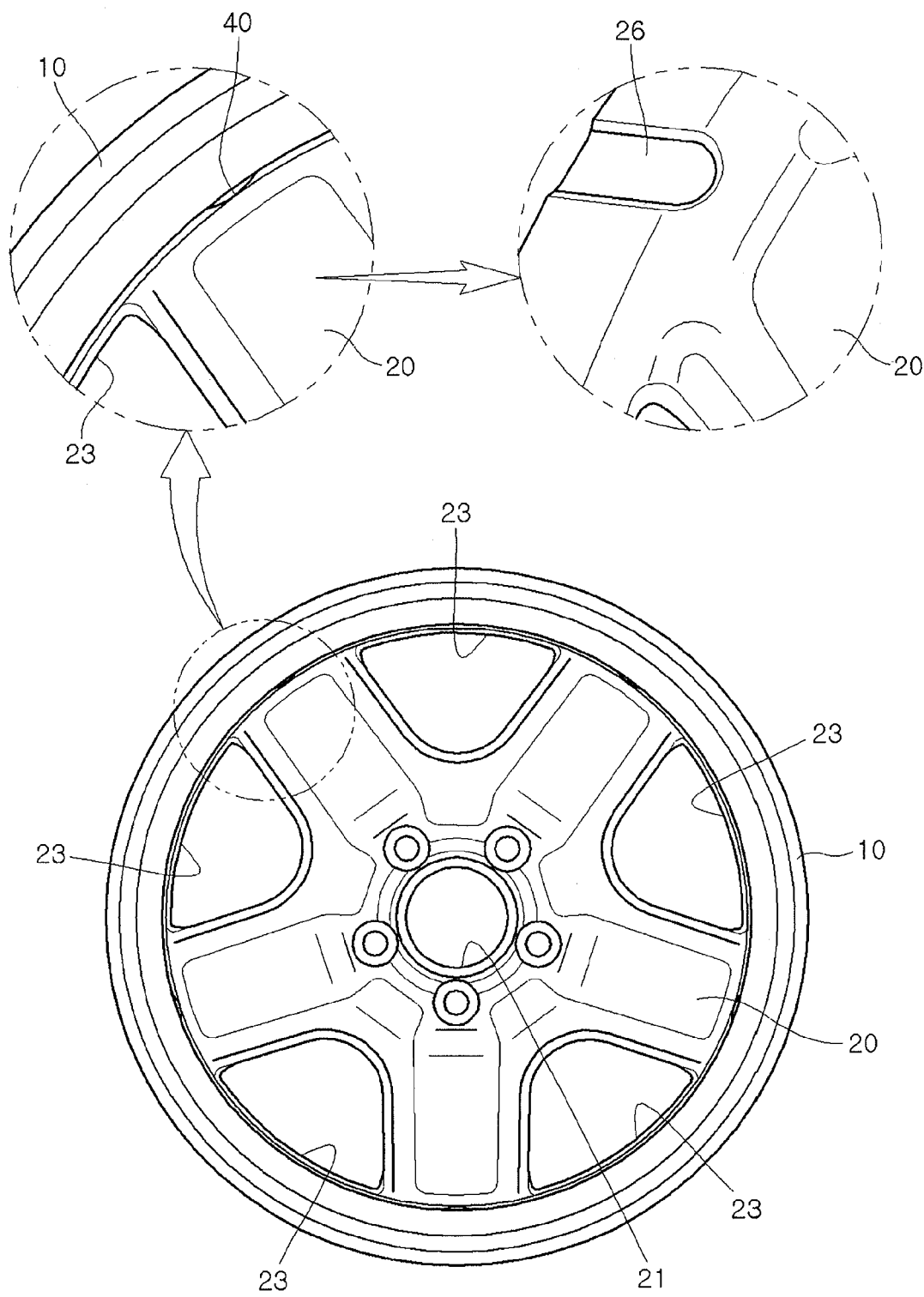
FIGS. 3 and 4 are front view and cross-sectional view illustrating a wheel for a vehicle according to the present disclosure.
Figure 4:
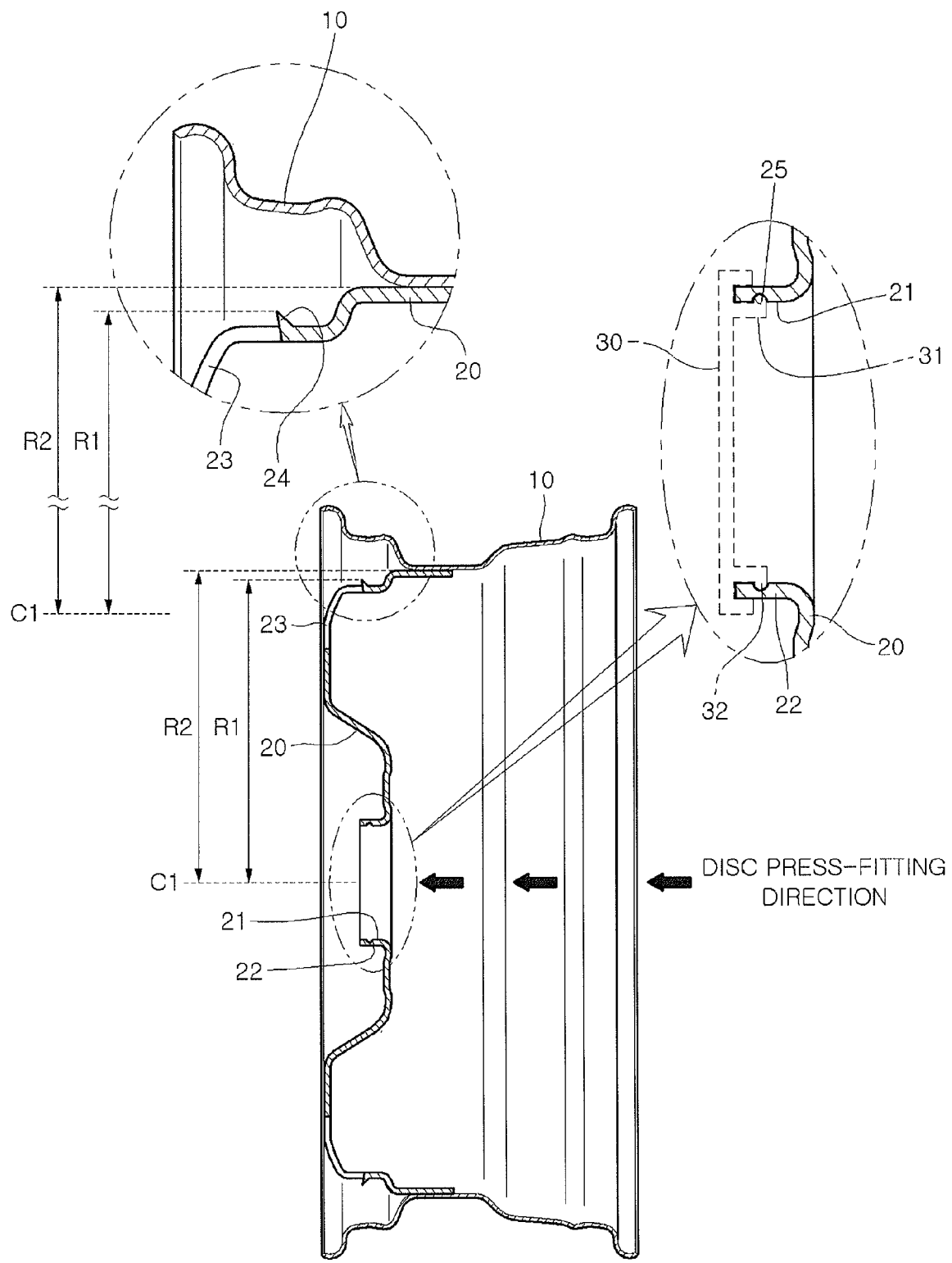

A wheel for a vehicle according to an embodiment is shown in FIGS. 3 and 4.

The illustrated wheel for a vehicle includes a rim or wheel rim 10 supporting a tire and a disc 20 integral to the rim 10.
Rim Portion without Burr In one embodiment, the disc 20 is press-fitted inside the wheel rim 10 in the direction of an arrow shown in FIG. 4. Then, in one embodiment, the disc 20 is welded to the rim 10.

In the illustrated embodiment, a hub hole 21 is formed at the center portion of disc 20, in which hub hole 21 is defined by a cylindrical flange 22 protruding to one side from the center of disc 20. A hub cap 30 is engaged with the cylindrical flange 22 to cover the hub hole 21 and avoid exposing the disc 20 to the outside.

Further, in the illustrated embodiment, a plurality of vent holes 23 are formed in the body of the disc 20 and are for discharging braking heat to the atmosphere. The vent holes 23 are circumferentially arranged at radially predetermined positions from the center of the disc 20.

In one embodiment of production of the disc 20, burrs 24 are formed on the edges of vent holes 23 when vent holes 23 are formed through disc 20. In the embodiment, the rim 10 is integrated with the disc 20 by forcibly press-fitting disc 20 into rim 10, without removing the burrs 24. As illustrated in the cross sectional view, the disc 20 has a rim portion that is press-fitted into the wheel rim 10 and a stepped portion from the rim portion radially toward the center of the disc 20. Further, as illustrated, the burrs 24 are formed on the stepped portion rather than the rim portion (or its surface) that slides and contacts the inner circumference of the wheel rim 10 during the press-fitting. In other words, the radius R1 from the center C1 of disc 20 to the end of burr 24 is smaller than the radius R2 from the center C1 of disc 20 to the outer circumference of disc 20.

In the illustrated embodiment, the tip of the burrs 22 do not contact or scratch the inner circumference of the wheel rim during the press-fitting, in which the disc 20 with burrs 24 is forcibly press-fitted into the rim 10 in the direction of an arrow shown in FIG. 4. Thus, the sharp ends of burrs 24 do not contact or scratch the inside of rim 10, such that the inside of rim 10 is not damaged by burrs 24. Therefore, according to the embodiment, it is not needed to perform a specific post-machining to remove burrs 24 produced after forming vent holes 23, such that it is possible to save time and cost for the post-machining.

Hub Cap Engaging Groove

Further, according to the embodiment, a hub cap 30 is provided to cover a hub hole 21 of the disc 20. In one embodiment, the hub cap 30 is sized to cover only hub hole 21. In the illustrated embodiment, a cap fitting groove 25 is formed on a cylindrical protrusion 22 that defines the hub hole 21. The cap fitting groove 25 is configured to engage with the hub cap 30.

In one embodiment, the cap fitting groove 25 is formed in a semicircular cross section that is concave toward the outer side from the inner side of cylindrical protrusion 22. The hub cap 30 includes a cap flange 31 having a cap projection 32 that is inserted in cylindrical projection 22 and separably fitted in cap fitting groove 25. The cap flange 31 is integrally formed with hub cap 30.

Therefore, the embodiment does not need to use a large cap that has a size covering the entire disc 20, such that it is possible to reduce the manufacturing cost and weight, and increase the fuel efficiency.

Water Discharge Hole

Further, in one embodiment, the wheel has a plurality of water discharge holes or passages 40 that are formed at the joint of rim 10 and disc 20. As illustrated in FIG. 3, for example, the disc 20 includes a plurality of disc grooves (or recesses) 26 that is concave toward the center C1 of disc 20 on the outer circumference of disc 20. Once the rim 10 and the disc 20 are integrated, spaces are formed between the inner circumference of rim 10 and the disc grooves 26. The spaces are discharge holes or passages 40.

Water discharge holes 40 prevent water from collecting or staying at the joint of rim 10 and disc 20 after the process of removing water.

That is, after rim 10 and disc 20 is assembled, the assembly is washed by a washing process, and water is removed and the assembly is coated after the washing.

Typically, water remaining on the rim 10 and disc 20 is removed, for example, by injecting high-pressure air in the washing process. However, water may stay at the joint of rim 10 and disc 20 even after the process of removing water. However, the water discharge holes 40 at the joint of rim 10 and disc 20 as in the embodiment would reduce the possibility of water remaining at the joint after water removal process.

Accordingly, it is less likely that spots are formed by remaining water when coating is performed.

What is claimed is:

1. A wheel for a vehicle, comprising:
   a wheel rim supporting a tire;
   a disc integrally fitted inside the wheel rim, the disc comprising a disc rim portion fitting into an inner circumference of the wheel rim, wherein the disc rim portion comprises a disc rim surface contacting the inner circumference;
   a plurality of vent holes formed through the disc; and
   at least one burr formed on an edge of the vent holes, wherein the at least one burr is formed on a surface other than the disc rim surface and protrudes away from the center of the disc such that a radial distance between a tip of the burr and the center of the disc is greater than a radial distance between the surface other than the disc rim surface and the center of the disc, wherein the radial distance between the tip of the burr and the center of the disc is smaller than a radial distance between the disc rim surface and the center of the disc.

2. The wheel for a vehicle as defined in claim 1, wherein the surface of the disc where the at least one burr is formed is stepped to the center of the disc from the disc rim surface.

3. The wheel for a vehicle as defined in claim 1, wherein the disc rim portion comprises a plurality of disc recesses, wherein the recesses and the inner circumference of the wheel rim in combination define a plurality of water discharge passages.

4. The wheel of claim 1, wherein the disc comprises a hub hole and a cylindrical flange defining the hub hole, wherein the cylindrical flange comprises a cap fitting groove, wherein the wheel further comprises a hub cap configured to engage with the cap fitting groove and to cover the hub hole.

5. The wheel for a vehicle as defined in claim 4, wherein the cap fitting groove has a semicircular cross section, and
   wherein the hub cap comprises a cap flange with a projection configured to be separably engaged with the cap fitting groove.

6. A vehicle comprising the wheel of claim 1.

* * * * *